United States Patent [19]

Cheenne-Astorino et al.

[11] Patent Number: 5,577,310
[45] Date of Patent: Nov. 26, 1996

[54] SUPPORT FOR FITTING A SHRINKABLE SLEEVE

[75] Inventors: Annie Cheenne-Astorino, Bruxelles; Christophe Brackeniers, Aalst, both of Belgium

[73] Assignee: Alcatel Cable, Clichy Cedex, France

[21] Appl. No.: 525,177

[22] Filed: Sep. 8, 1995

[30] Foreign Application Priority Data

Sep. 14, 1994 [FR] France .................... 94 10971

[51] Int. Cl.$^6$ .................................................. B23P 19/02
[52] U.S. Cl. ................... 29/235; 29/745; 29/828; 29/859; 29/869; 174/84 R; 174/135
[58] Field of Search ............... 29/33 M, 33 T, 29/281.6, 282, 235, 447, 450, 745, 752, 758, 759, 760, 828, 859, 868, 869; 174/84 R, 85, 135; 269/903

[56] References Cited

U.S. PATENT DOCUMENTS

| 3,384,700 | 5/1968 | Mier et al. | 174/84 R X |
| 3,515,798 | 12/1968 | Sievert | 174/135 |
| 3,808,352 | 4/1974 | Johnson | 29/859 X |
| 3,946,480 | 3/1976 | Dienes | 29/828 X |
| 4,140,412 | 2/1979 | Vitt | 29/447 X |
| 4,164,621 | 8/1979 | Silva | 29/828 X |
| 4,506,430 | 3/1985 | Guzay, Jr. | 29/450 |
| 4,871,599 | 10/1989 | Knorr | 29/235 X |

FOREIGN PATENT DOCUMENTS

| 0424090A2 | 4/1991 | European Pat. Off. . |
| 2505567 | 11/1982 | France . |
| 2592825 | 7/1987 | France . |
| WO93/22816 | 11/1993 | WIPO . |

Primary Examiner—Peter Vo
Attorney, Agent, or Firm—Sughrue, Mion, Zinn, Macpeak & Seas

[57] ABSTRACT

A support for fitting a shrinkable sleeve onto an object inside the support and the sleeve 11 mounted on it includes at least two tubular parts removed in turn from under the sleeve. It further includes means for temporarily immobilizing the last part to be removed from under the sleeve during removal of the other tubular part.

8 Claims, 3 Drawing Sheets

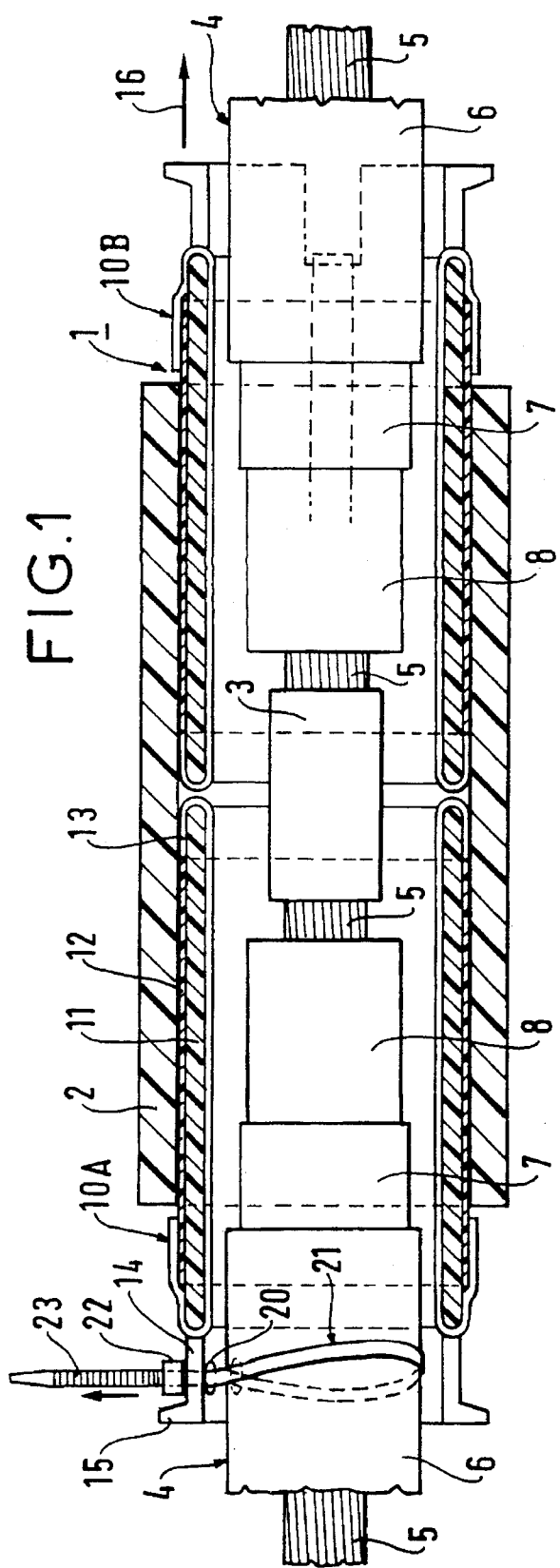
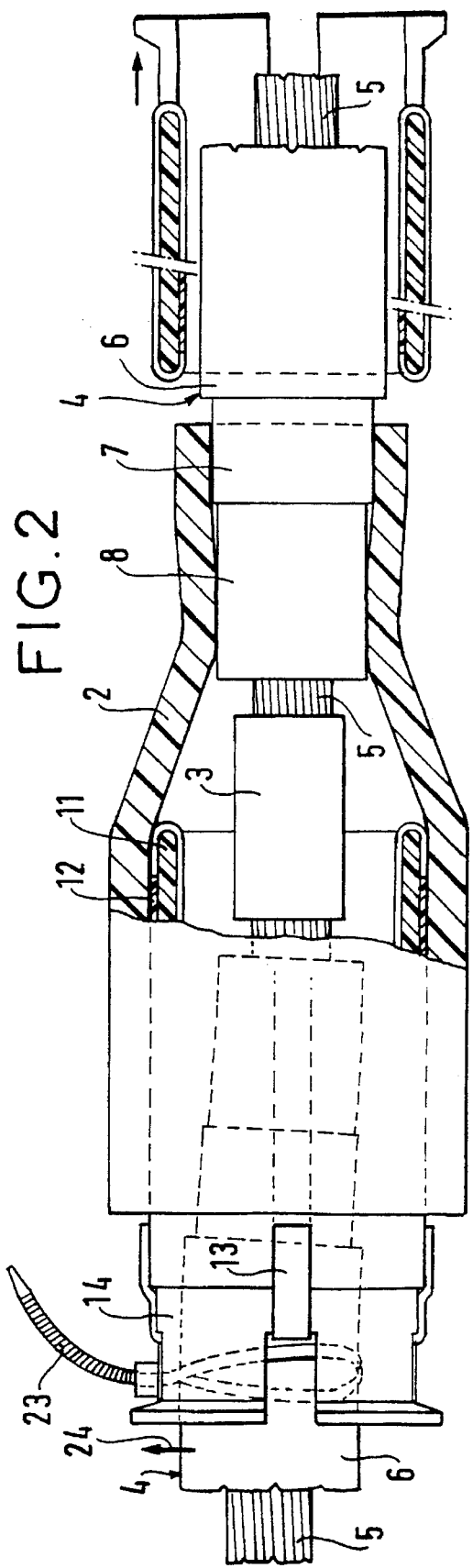
FIG.1
FIG.2

SUPPORT FOR FITTING A SHRINKABLE SLEEVE

BACKGROUND OF THE INVENTION

1. Field of the Invention

The present invention concerns a support for fitting a shrinkable sleeve tightly to an object to be covered.

2. Description of the Prior Art

This type of support is known in itself and is used, among other things, to fit a sleeve over a cable termination or over a joint between two cables or over any object onto which a sleeve is to be shrunk. The support initially carries the prestretched sleeve and is mounted over the object to position the sleeve over the object. It is then removed to place the sleeve directly over the object whereupon it shrinks into place.

Document FR-A-2 592 825 describes one embodiment of a support of this kind comprising a tube which is removed from under the prestretched sleeve to fit the sleeve over a member inside it. According to this document, a slippery film covers the exterior surface of the tube over at least part of its length. The film is fixed to a front end of the tube and is not attached to the exterior surface of the tube; it is trapped between the prestretched sleeve and the tube. The tube is removed by pulling on its rear end which advantageously is not covered by the film.

As the tube is withdrawn the sleeve shrinks into place on the object, with the film doubling back on itself between the sleeve and the object. When the tube has been completely extracted from under the sleeve, the film is in turn removed by further movement of the tube.

In practise, a support of this kind is used when the sleeve is relatively short and/or relatively thin. If the sleeve is long and/or thick a two-part support is used, the two parts of which are two tubes like the tube described above, independent of each other and abutted head-to-head to carry the prestretched sleeve. To fit the sleeve the two parts are withdrawn from under the sleeve one after the other.

The problem with a double-tube support of this type is that when the first of the two tubes is withdrawn the second tube tends to move with it on the object. This leads to incorrect positioning of the sleeve on the object.

Document US-A-3 515 798 describes another embodiment of a support of this kind, in the form of a spiral tube. The spiral tube has continuous spiral turns joined together along their length to define linked tubular parts equal in number to the turns in the single spiral tube.

The spiral tube is withdrawn from the prestretched sleeve by pulling on the turn at the front end and on the subsequent turns, from the rear end of the tube, to dismantle the tube. A lug joined to the front turn extends for this purpose through the inside of the tube and beyond its rear end.

Document WO 93/22816 also describes a spiral tube support with annular turns which define a serpentine between them to separate the turns alternately in one direction and in the opposite direction.

These spiral supports have the same problem as the two-part supports and tend to move on the object when they are dismantled to remove them from under the sleeve, with the result that the sleeve is fitted incorrectly.

An object of the present invention is to solve this problem and thereby to enable correct fitting of the shrinkable sleeve.

SUMMARY OF THE INVENTION

The present invention consists in a support for fitting a shrinkable sleeve, adapted to carry the prestretched sleeve, for locating said sleeve over an object and fitting and clamping said sleeve to said object by removal of said support from under said sleeve, including substantially contiguous tubular parts removed in turn from under said sleeve, and means for temporarily immobilizing the last tubular part to be removed from under said sleeve for fixing said last tubular part relative to said object during removal of each other tubular part.

The support advantageously has at least one of the following additional features:

the immobilizing means comprise a cable tie passing through said last tubular part and forming a loop therein, closed upon itself outside said last tubular part, and for which two passages are provided through said last tubular part.

it comprises two tubes adapted to be disposed end-to-end at their front ends, constituting said tubular parts, and said immobilizing means are mounted on the rear end part of the tube removed last, which constitutes said last tubular part.

said support is a single spiral tube the turns of which constitute said tubular parts to be removed successively from under said sleeve from one of the two front turns and said immobilizing means are disposed through a rear turn at the opposite end from the front turn, these rear turns constituting said last tubular part to be removed.

The features and advantages of the present invention will emerge from the following description of embodiments of the invention shown in the appended drawings.

BRIEF DESCRIPTION OF THE DRAWINGS

FIG. 1 is a diagrammatic sectional view of a support in accordance with the invention for fitting a shrinkable sleeve.

FIG. 2 is a diagrammatic view of part of the support from FIG. 1, showing the operation of fitting the sleeve.

DETAILED DESCRIPTION OF THE PREFERRED EMBODIMENTS

Figure 5:
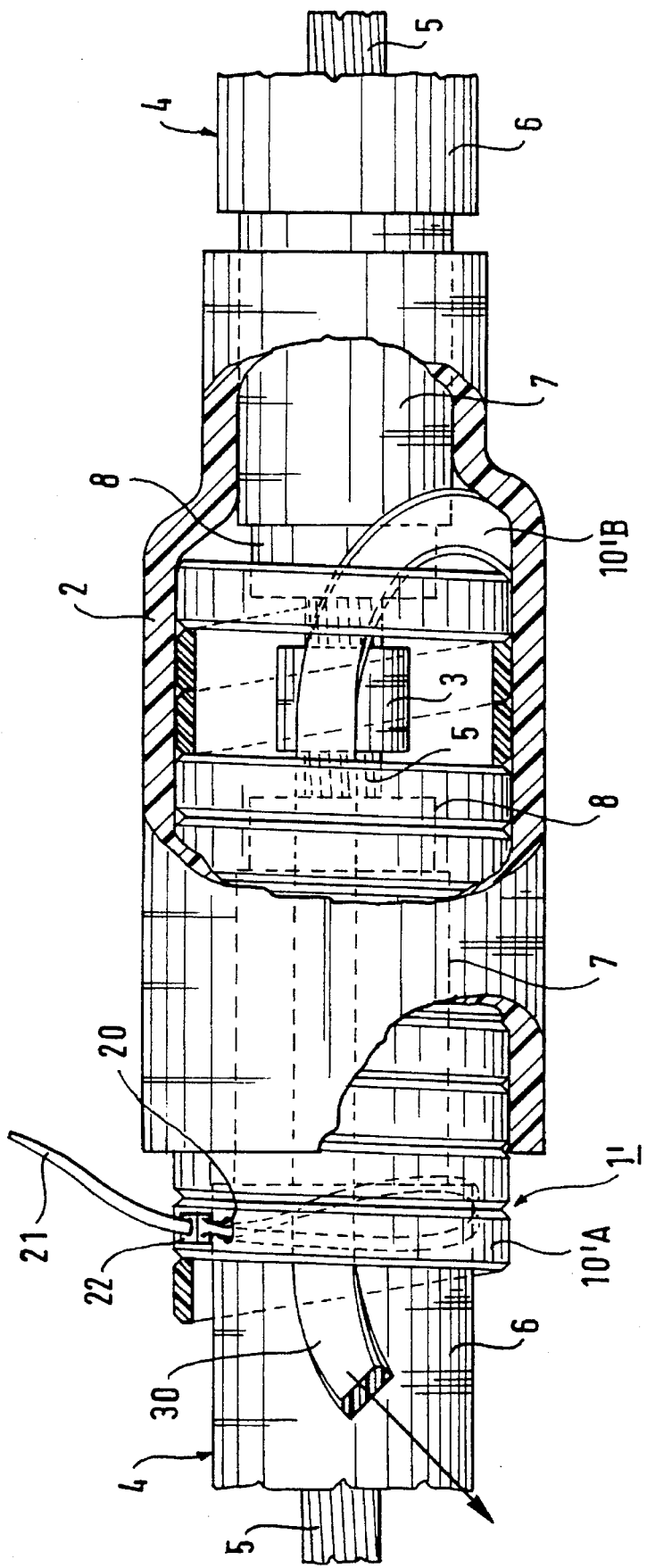
FIG. 5 is a diagrammatic view of an alternative embodiment of the support of the invention.

FIGS. 1, 2 and 5 show a support 1 or 1' in accordance with the invention for fitting an elastically shrinkable sleeve 2 onto a joint 3 between two cables 4, the joint being visible in FIGS. 1, 2 and 5 only. In these examples the joint joins the bared cores 5 of the two cables, the end parts of the cables being prepared beforehand by stepped stripping of the outer jacket 6, the conductor and/or semiconductor screen 7 and the interior insulation 8 around the core of each cable.

In these examples the sleeve 2 is part of the joint, partially covers the bared screen of each cable and extends between the screens. Alternatively, it can provide external protection of the joint in which case it extends over the end parts of the cable jackets and between them. A further alternative is for it to be part of the joint, constituting the joint body and at the same time providing exterior protection of the joint. The sleeve as such is not part of the present invention and for this reason has been shown as a single-layer sleeve. In practise it is a single-layer or multilayer sleeve and/or a two-part sleeve, depending on its function.

Referring to FIGS. 1 and 2, the support 1 comprises two tubular parts 10A and 10B that are similar to each other and disposed end-to-end at their front end. It carries the prestretched sleeve which extends over the two tubular parts and is used to fit the sleeve over and shrink the sleeve onto the joint 3 and the bared parts of the two cables. Its inside dimensions are sufficient for it to slide along the cables to locate it with the sleeve on it over the object 3. Its tubular parts are then withdrawn from under the sleeve to fit the sleeve.

The two tubular parts are identical with the exception of a special feature provided on only one or (provided on both but used on only one), as explained below.

Each tubular part comprises (these reference numbers are shown for part 10A only): a rigid and preferably plastics material tube 11 and a strong flexible film 12 having a low coefficient of friction. The film covers the outside surface of the tube and extends from its front end substantially to is rear end. The film is preferably not attached to the tube 11 and preferably does not cover the rear end of the tube. The tube carries means 13 for pulling the film 12 from its outside surface around its front end and along its inside surface when this tubular part is pulled rearwardly from under the sleeve.

In this example these means comprise a set of belts attached to the front and the rear edges of the film and joining them together. The belts are inside the tube and outside the rear part of the tube. In an alternative embodiment, these belts are outside and inside the tube and each forms a closed loop for pulling the film. The film and the belts are of a similar nature. They preferably have a thin non-stick surface coating, for example a silicone-based coating.

Figure 4:
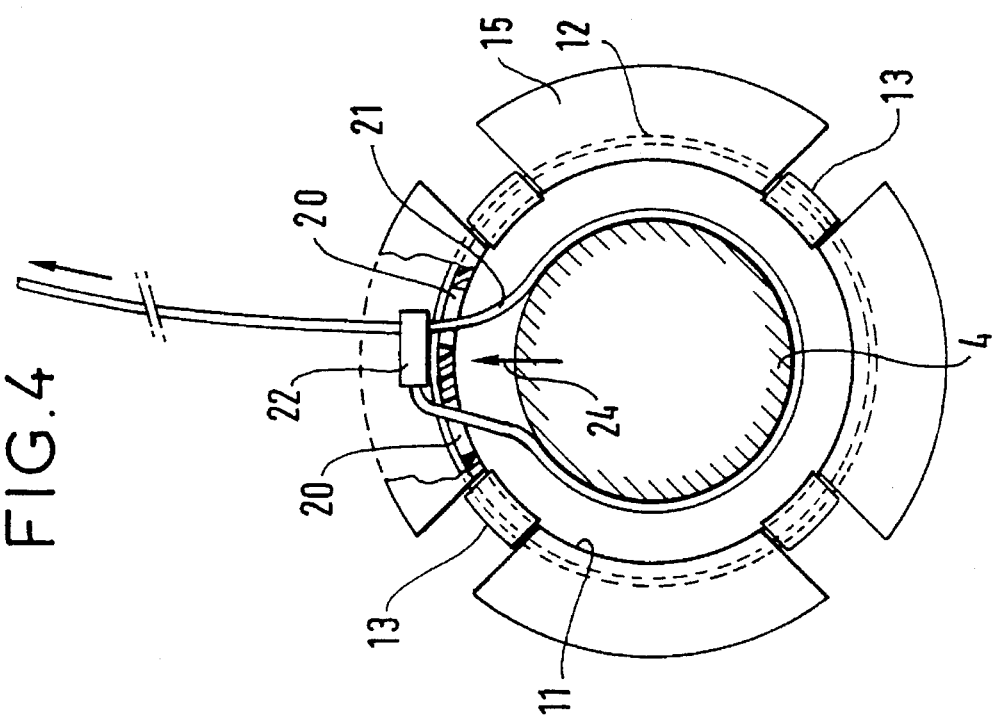
FIGS. 3 and 4 are respectively a perspective view and a side view of part of the support from FIG. 1.
Figure 3:
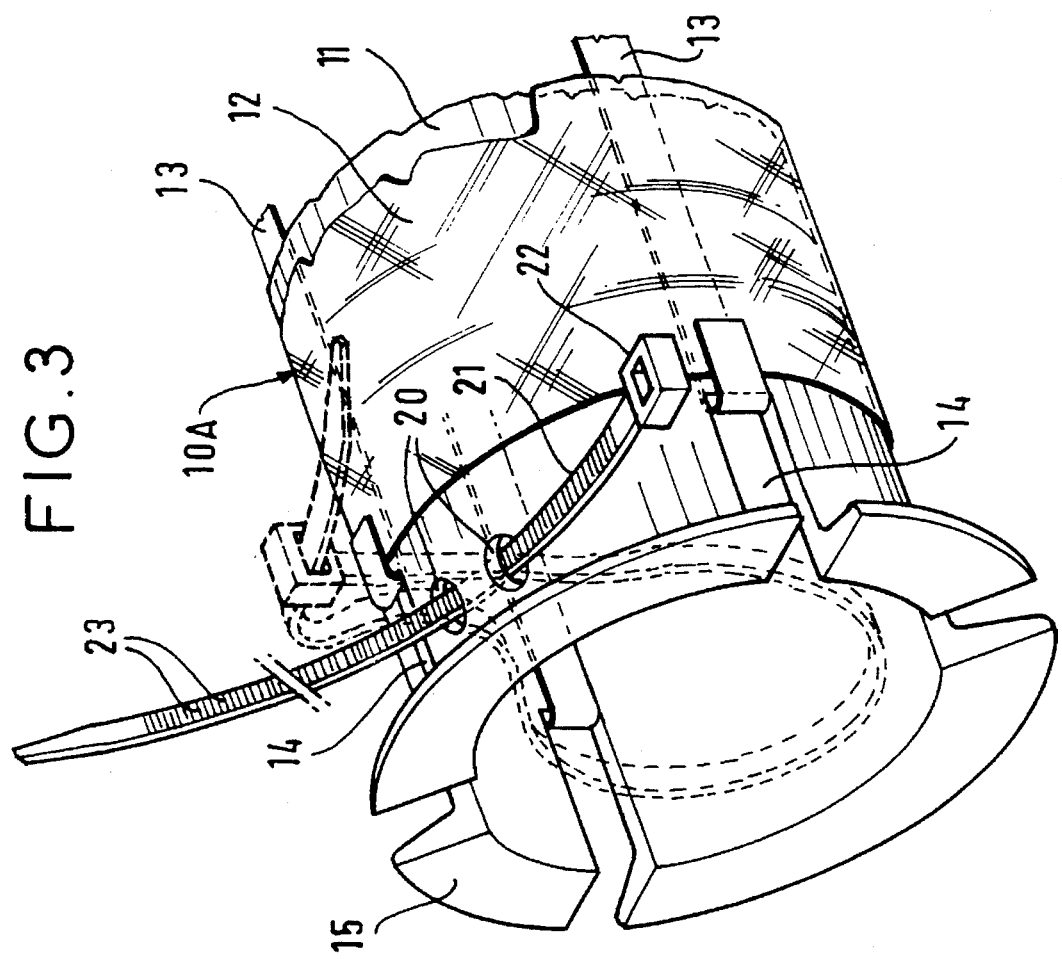

As shown also in FIGS. 3 and 4, the rear part of each tube 11 includes a set of slots 14 through which the belts pass from the inside to the outside of the tube. The tube also has a shoulder 15 at the rear end to facilitate application of rearward traction to the tube, as shown by the arrow 16 for the tubular part 10B (and in the opposite direction for the other part 10A). This shoulder can naturally be replaced by any other means facilitating the application of rearward traction to the tube, for example holes for inserting a traction tool into the rear part of said tube.

One of the tubes 11 (or preferably both tubes so that they are identical) also has two passages 20 side by side in the rear part of the tube. On one tube only these two passages receive means 21 for immobilizing the tube 11 or the tubular part 10A concerned during removal of the other tubular part 10B from under the sleeve.

The means 21 hold the tubular part 10A in place on the corresponding cable 4, i.e. relative to the object 3.

As shown, the means 21 comprise a cable tie passing through both passages in the tube to form a loop around the cable 4. It is closed on itself outside the tubular part 10A. To this end it has a buckle 22 at one end adapted to receive the other end. The latter advantageously has striations 23 to prevent it slipping in the buckle when the tie is tightened to hold the cable 4 against the tubular part 10A, as shown symbolically by the arrow 24 in FIGS. 1, 2 and 4, the tightened position being as shown in FIG. 2.

FIG. 2 shows the sleeve 2 partially clamped in place as the result of removal of the tubular part 10B from under the sleeve by pulling it in the direction of the arrow 16. The tubular part 10A is firmly held in position relative to the object 3 throughout the removal of the part 10B. To remove it from under the sleeve, the tie is opened or cut to release the tubular part 10A relative to the cable 4 and therefore the object 3.

Once they have been removed from under the sleeve, the tubular parts are taken off the cables 4. In the manner that is well known in itself, the tubes incorporate for this purpose a longitudinal line of weakness. The film, which lies against the inside surface of the tube when the latter has been drawn from under the sleeve, can easily be pulled back onto the outside of the tube, by manually pulling on the belts 13, so that it can be cut before the tube 11 is dismantled.

In FIG. 5, the support 1' is of the spiral type but is otherwise a support in accordance with the invention.

The spiral support 1' is made up of successive turns fastened together lengthwise and adapted to be separated by pulling on the turn 10'B at the front end and on the subsequent turns from the rear end of the support. An additional length 30 is attached to the front turn 10'A and is accessible from the rear end of the support to apply the traction. The various turns are analogous to tubular parts of a single tubular support that are removed one by one from under the sleeve 2.

Like the previous support 1, the support 1' is provided with means for immobilizing the rear part while the front turn and the subsequent turns are separated and removed from under the sleeve.

It includes two passages 20 through its rear turn or one of the turns in its rear part, through which are passed the immobilizing means for preventing movement in translation relative to the corresponding cable and the joint.

These means are a tie as in the previous figures, for example, designated by the reference numbers previously used. They are released for final removal of the rear turn or turns.

The spiral support 1' can have a line of weakness (not shown) and be formed of turns or annular rings fastened together along a line of weakness, to be separated by alternate unwinding in one direction and the other.

In a further embodiment that is not shown but is deduced from the two examples illustrated, the support for fitting the retractable sleeve can comprise two spiral tubes disposed end-to-end to carry the sleeve. In this case one of the last turns of each of the two spiral tubes to be removed from under the sleeve is temporarily immobilized during removal of its front turns.

The successive individual turns can naturally themselves be removed by unwinding them in the same direction or in alternate directions.

There is claimed:

1. Support for fitting a shrinkable prestretched sleeve, adapted to carry the prestretched sleeve, for locating the sleeve over an object and fitting and clamping the sleeve to said object by removal of the support from under said sleeve, said support including substantially contiguous tubular parts removed in turn from under said sleeve, and means for temporarily immobilizing a last of said tubular parts to be removed from under said sleeve comprising means for fixing said last tubular part relative to said object during removal of each of said other tubular parts and prior to removing said last tubular part.

2. Support according to claim 1 wherein said immobilizing means comprise clamping means carried by said last tubular part and extending inside the last tubular part, and including means for releasing said clamping means from outside said last tubular part.

3. Support according to claim 2 wherein said immobilizing means comprise a cable tie passing through two passages provided within said last tubular part and forming a loop therein, closed upon itself outside said last tubular part.

4. Support according to claim 1 comprising two tubes disposed end-to-end at their front ends, and wherein said immobilizing means are mounted on a rear end part of one of said tubes constituting said last tubular part.

5. Support according to claim 4 wherein each of said tubes carries on its exterior a strong and flexible film having a low coefficient of friction and each film extending over at least part of a length of the tube from a front end thereof.

6. Support according to claim 5 wherein said film is not attached to the tube and each tube further includes means for pulling said film around said front end and inside the tube when each tube is removed.

7. Supporting according to claim 4 wherein said two tubes are spiral tubes.

8. Support according to claim 1 comprising a single spiral tube of successive turns forming said tubular parts, adapted to be removed from under said sleeve by separating the successive turns forming said tubular parts by pulling on a front end turn thereof and on the subsequent turns from a rear end of said tube, wherein said immobilizing means are mounted through a rear one of the turns at an end opposite the front end turn, and wherein rear turns thereof comprise said last tubular part.

* * * * *